(12) United States Patent
Glaeser et al.

(10) Patent No.: US 8,127,003 B2
(45) Date of Patent: Feb. 28, 2012

(54) METHOD OF OPERATING A NETWORK SUBNET MANAGER

(75) Inventors: Frank Glaeser, Hannover (DE); Andreas Matthias Aust, Hannover (DE); Jens Brocke, Laatzen (DE); Eduard Siemens, Sehnde (DE); Ralf Koehler, Hannover (DE); Stefan Kubsch, Hohnhorst (DE)

(73) Assignee: Thomson Licensing, Issy-les-Moulineaux (FR)

( * ) Notice: Subject to any disclaimer, the term of this patent is extended or adjusted under 35 U.S.C. 154(b) by 43 days.

(21) Appl. No.: 12/592,130

(22) Filed: Nov. 19, 2009

(65) Prior Publication Data
US 2010/0138532 A1    Jun. 3, 2010

(30) Foreign Application Priority Data
Nov. 28, 2008    (EP) .................................... 08305870

(51) Int. Cl.
*G06G 15/173*    (2006.01)
(52) U.S. Cl. ........................ 709/224; 709/223; 714/4.11
(58) Field of Classification Search .......... 709/220–224, 709/248–249
See application file for complete search history.

(56) References Cited

U.S. PATENT DOCUMENTS

| | | | |
|---|---|---|---|
| 7,194,540 B2 * | 3/2007 | Aggarwal et al. | 709/225 |
| 7,653,769 B2 * | 1/2010 | Fisher et al. | 710/104 |
| 2003/0208572 A1 | 11/2003 | Shah et al. | |
| 2004/0088361 A1 * | 5/2004 | Statman | 709/206 |
| 2005/0071452 A1 * | 3/2005 | Rosenstock et al. | 709/223 |
| 2005/0071709 A1 * | 3/2005 | Rosenstock et al. | 714/5 |
| 2005/0111366 A1 * | 5/2005 | Whittaker Stewart | 370/235 |
| 2008/0080384 A1 * | 4/2008 | Atkins et al. | 370/252 |
| 2009/0141728 A1 * | 6/2009 | Brown et al. | 370/395.31 |

FOREIGN PATENT DOCUMENTS
WO    WO 2008/074370 A1    6/2008

OTHER PUBLICATIONS

Search Report dated Mar. 25, 2009.
"Infiniband Architecture Specification vol. 1 Release 1.1" Nov. 6, 2002 Infiniband Trade Association, XP002520540.

* cited by examiner

*Primary Examiner* — Mohamed Ibrahim
(74) *Attorney, Agent, or Firm* — Myers Wolin, LLC

(57) ABSTRACT

A method of operating a network subnet manager, in particular Infiniband network subnet manager in a subnet of a network. Only one subnet manager entity can be master within a subnet. A problem related with this specification is that a specific vendor implementation may exist with many features and internal functionality that are not specified in the network specification. If such a subnet manager loses its exclusivity because another subnet manager enters the subnet, having higher priority, the additional features from the vendor implementation can no longer be used in the subnet. The proposed method solves this problem by allowing a subnet manager that has a lower hierarchy level and thus lower priority to maintain its managing operation by becoming the master subnet manager again.

9 Claims, 3 Drawing Sheets

METHOD OF OPERATING A NETWORK SUBNET MANAGER

This application claims the benefit, under 35 U.S.C. §119 of European Patent Application 08305870.1, filed Nov. 28, 2008.

FIELD OF THE INVENTION

The present invention relates to a method of operating a network, in particular Infiniband network, subnet manager in a subnet of the network.

BACKGROUND OF THE INVENTION

The operation of a local high speed network is dependent on the capability of transferring data with a high speed. Particularly, for a remote direct memory access (RDMA) via a network, for example in high performance computing, the network has to admit lossless data transfer with high data rates and very low latency.

One suggestion to implement these requirements is to use the Infiniband architecture. Infiniband is a trademark of the Infiniband Trade Association. A reference to Infiniband herein means a reference to the Infiniband specification, particularly the Infiniband architecture, issued by the Infiniband Trade Association. The Infiniband architecture comprises nodes that are connected via a fabric. A node can be a processor node, an I/O unit, and/or a router to another Infiniband sub-network.

The administration of an Infiniband network is performed by a so-called Infiniband subnet manager. The Infiniband subnet manager is a software entity with the task to manage an Infiniband subnet and can reside on any one node. The subnet manager discovers the topology of the subnet that it manages, assigns a subnet ID to each port, assigns an address to each port in the subnet, establishes the possible paths between all end nodes in the subnet, sets QoS parameter and sweeps the subnet on a regular basis looking for topology changes.

Only one subnet manager entity can be master within a subnet. All other started subnet manager entities in the subnet are in a standby state or in a not-active state. The subnet manager entity with the highest priority and the lowest global user identity (GUID) has to become master during a failover from the actual master.

FIG. 3 shows a state machine presentation of an Infiniband subnet manager. After an initialization 101, the Infiniband subnet manager is in the discovering state 103. In this state, the Infiniband subnet manager performs sweeping the network for discovering changes, for example, discovering new nodes. When the subnet manager discovers another subnet manager with a higher priority or a master, it changes to a standby state 107. A subnet manager in standby state may change 109 again to the discovering state 103 upon a polling timeout or reception of a discover control packet. On reception of a disable control packet, 115, the Infiniband subnet manager may change from the standby state 107 to the not-active state 113, and, on reception of a standby control packet, 117, the Infiniband subnet manager may change from the not-active state 113 to the standby state 107. In case the subnet manager is in the standby state 107 and receives a handover control packet, 119, it change from the standby state 107 to the master state 121, and, thus, becomes a master subnet manager. Also, in the case the discovering is completed, 111, the subnet manager can change from the discovering state 103 to the master state 121, when it did not discover any other subnet manager. The subnet manager can leave the master state 121 upon, for example, a response to poll, a topology change or reception of a handover control packet.

A subnet manager uses control packets to command another subnet manager to change its state. A change of state is initiated by, for example, a handover control packet that is used by the current subnet manager to initiate handing over mastership of the subnet, an acknowledge control packet that is used by the new master to acknowledge the hand over from the old master, a disable control packet that is used from the current master to transfer another subnet manager from standby state to not-active state, a standby control packet that is used by the current master to transfer an other subnet manager from the not-active state to the standby state, and a discover control packet that is used to transfer a subnet manager from the standby state to the discovering state. The control packet may also be termed as administrative message and, for example, a standby control packet may for the reason of brevity be termed as standby message.

A problem is that in a specific vendor implementation a lot of features and internal functionality may exist which are not specified in the Infiniband specification. In the case, a specific subnet manager is implemented having a lot of additional features compared with a conventional subnet manager, there is no possibility to ensure that the specific subnet manager will stay the master within the subnet. Is there another new subnet manager entity on a port with a higher priority or the same priority and a lower GUID, the specific subnet manager has to handover the master state to the other subnet manager. Thus, it can not be excluded that the new master is from another vendor and has not implemented the additional features. In this case, the Infiniband applications that depend on the Infiniband subnet manager with the additional features can not use these additional features any longer, with the potential consequence that they have to terminate their execution.

SUMMARY OF THE INVENTION

It is an object of the invention to provide an improved method of operating an Infiniband network subnet manager, particularly, a method that permits maintaining of specific features of a specific subnet manager.

This object is solved by a method of operating an Infiniband network subnet manager according to claim 1, an Infiniband subnet according to claim 6, a computer program product and a computer program according to claims 7, 8 and 9, respectively. Advantageous embodiments are specified in the dependent claims.

According to one aspect of the invention, a method of operating a subnet manager in a subnet of an Infiniband network is provided, comprising the steps of: discovering, by the subnet manager, a new network component added to the subnet; if on the new network component an other subnet manager is running that is different from the subnet manager, evaluating which one of the subnet managers has a lower hierarchy level; and in dependency on the step of evaluating, permitting the subnet manager with the lower hierarchy level to be master subnet manager in the subnet.

In here, a subnet manager that is active is meant to be a subnet manager that is in the discovering state or the master state. In the discovering state, the active subnet manager sweeps the subnet to find new network components which might have been added to the subnet since the last sweep. When the active subnet manager finds another subnet manager in the subnet, the other subnet manager is also termed as new subnet manager, although it may also be in a discovering state.

Conventionally, a hierarchy level of a subnet manager is determined by its priority and GUID and a subnet manager with a higher hierarchy level will, by the Infiniband specification, get the master state. Contrary to the conventional operation, the invention allows also a subnet manager that is on a lower hierarchy level to remain in a master state. As a consequence, a specific subnet manager having specific features may remain the master subnet manager, even if it is on a lower hierarchy level.

In a preferred embodiment of the invention, the hierarchy level is defined by at least one of a priority, a GUID, a vendor ID, a memory size and a processor speed of the network component on which the subnet manager runs. Any further information that may be gathered from a subnet manager may be used. It is also contemplated to use, for example, the time span during which a subnet manager has been active.

In a preferred embodiment of the invention, the step of permitting comprises a step of sending a disable message to the subnet manager with the higher hierarchy level. Thus, the subnet manager with the higher hierarchy level acquires the not-active state.

In a further preferred embodiment of the invention, the step of permitting comprises a step of storing in a database the subnet manager to which the disable message has been sent. In other words, when the subnet manager with the lower hierarchy sends the disable message to the subnet manager with the higher hierarchy level, the subnet manager with the lower hierarchy stores the subnet manager with the higher hierarchy level so that it is kept track which subnet managers have been sent to the not-active state.

According to a preferred embodiment of the invention, in case the master subnet manager is going to loose its master state, a standby message will be sent to the subnet manager that has been stored in the database. Thus, the subnet manager in the not-active state acquires the standby state.

In an illustrative example, a method of operating a subnet manager in an Infiniband network is provided, comprising the step of performing, by the subnet manager, a subnet sweep for discovering a new network component that might have been added to the subnet since the last sweep. A subnet sweep is a procedure for determining the actual network topology by discovering changes at the network topology within the subnet.

For example, a network component may be discovered that has not been discovered in a preceding subnet sweep. Such a network component may be termed as a new network component and will be handled in a known matter, for example, by registering it in a database. In the case, a new network component is discovered, it has to be checked whether the new network component contains another subnet manager. As there may be only one master subnet manager per Infiniband subnet, a specific handling has to be performed, in order to let only one subnet manager be master: a specific property, for example a hierarchy level, of the other subnet manager has to be determined. Based on this determined specific property of the other, that is, new, subnet manager, the master subnet manager decides, whether or not to send at least one administrative message to the new subnet manager. The administrative message will be a specific control packet, for example, a handover control packet, an acknowledge control packet, a disable control packet, a standby control packet, or a discover control packet. In case, the new subnet manager has a lower hierarchy level, for example, a lower priority or the same priority and a higher GUID, the master subnet manager may ignore the existence of the other subnet manager because the latter has to go into the standby state by its own. If however, the other subnet manager has a higher hierarchy level, for example, a higher priority or the same priority and a lower GUID, the master subnet manager of the invention sends an administrative message to the new subnet manager. Herein, an administrative message is meant to be a message that forces the other subnet manager to undergo a state change. In other words, an extended subnet manager is provided that is able to maintain its master state even, if an other subnet manager with an equal or higher hierarchy level is added to the subnet.

The specific property or hierarchy level may also comprise a vendor information or a capability set information. Thus, it is possible for the master subnet manager to determine, if the other subnet manager is likely to also have the same additional features as the active subnet manager, or not.

The administrative message is at least one of a disable message and a standby message. But of course other messages are also contemplated, as, for example handover or acknowledge.

In an example, if the new subnet manager is from a different vendor than the master subnet manager having vendor specific additional features or capabilities, the master subnet manager sends a disable message to the new subnet manager with the result that the new subnet manager will not interfere with the master subnet manager. In a further example, the disable message is sent, by the master subnet manager, to the new subnet manager, even if the new subnet manager has a higher hierarchy level, for example, a higher priority or the same priority but lower GUID than the active subnet manager. Thus, it is ensured, that the specific additional features of the active subnet manager are still accessible for an Infiniband subnet application that depends on these vendor specific additional features.

In a further example, if the new subnet manager is from the same vendor as the master subnet manager and the new subnet manager has a higher hierarchy level than the actual master subnet manager, the master subnet manager sends a standby message to all other subnet managers it has previously sent a disable message. Thus, two objectives are achieved: First, as the new subnet manager is from the same vendor, it may be expected that it provides at least the same—if not improved—additional features compared with the actual master subnet manager. Thus, the cooperation of the Infiniband network application depending on the additional features will not be affected. Second, all other subnet managers that have been switched off by the master subnet manager by sending disable message from the actual master subnet manager to the respective other subnet managers, are brought back to their standby states. This is permitted by the active subnet manager by storing the other subnet managers in a data base. In a subsequent step, the master subnet manager hands over its master state to the new subnet manager that is from the same vendor.

According to another aspect of the invention, an Infiniband network is provided that comprises a subnet manager as is described above.

According to another aspect of the invention a computer program product is provided having program code that is adapted to execute the method as described above when the code is operated on a computer. A computer may be a personal computer, or a microcontroller or any suitable data processing apparatus.

According to another aspect of the invention a computer program is provided that comprises instructions that are adapted to execute the method as described above when the code is operated on a computer.

According to a preferred embodiment of the invention, the computer program is stored on a data storage medium. The data storage medium may be a HDD, a flash memory, a USB stick, a memory card, a floppy disk, CD, DVD or a digital camera.

BRIEF DESCRIPTION OF THE DRAWINGS

Following preferred embodiments of the invention are described in detail by referring to Figures. In the Figures shows.

DETAILED DESCRIPTION OF PREFERRED EMBODIMENTS

The present invention, in a preferred embodiment, proposes a method of operating a subnet manager in a subnet of an Infiniband network that provides maintaining its master state, even when another node which contains a subnet manager instance is added to the network.

Figure 1:
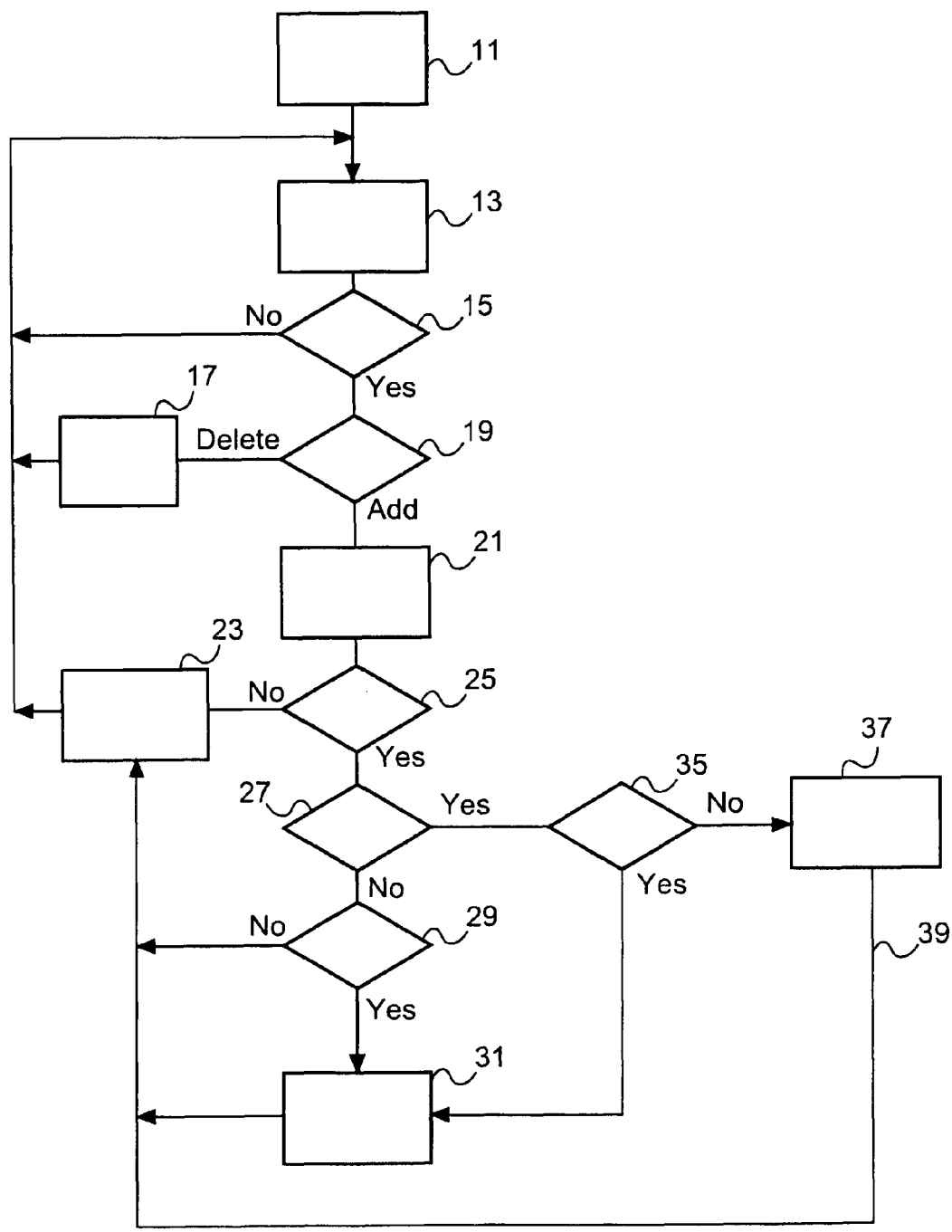
FIG. 1 a flow chart illustrating an operation of an extended subnet manager, FIG. 2 a flow chart illustrating an operation of an extended subnet manager with acceptance of subnet managers from a same vendor, and FIG. 3 a state machine presentation of an Infiniband subnet manager.
Figure 3:
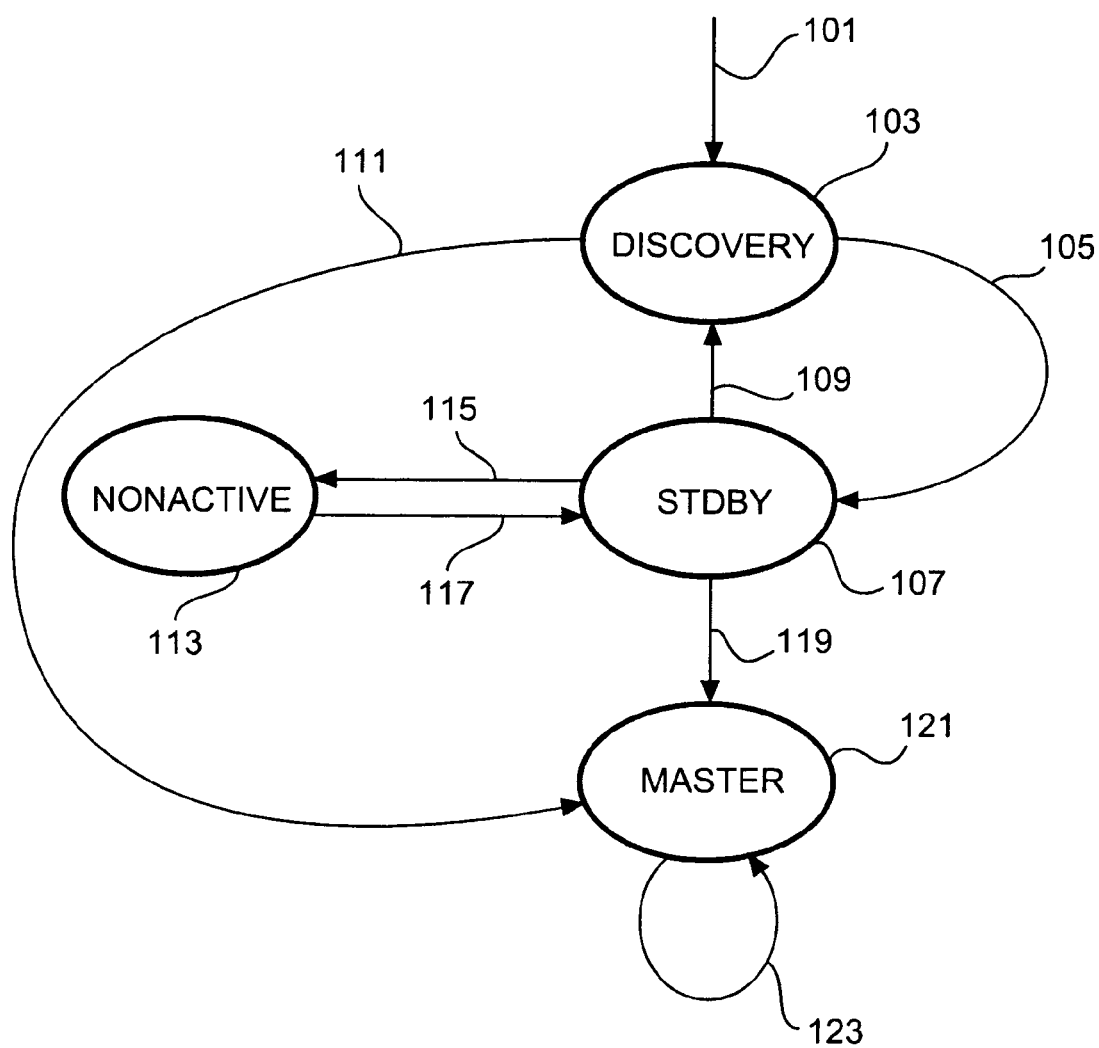

According to FIGS. 1 and 3, that show a flow chart illustrating an operation of an extended subnet manager, in the preferred embodiment, the method of operating a subnet manager in a subnet of an Infiniband network comprises the steps of: discovering 13, 103, by the subnet manager, a new network component added to the subnet; if on the new network component an other subnet manager is running 25 that is different from the subnet manager, evaluating 29, 25 which one of the subnet managers has a lower hierarchy level; and in dependency on the step of evaluating, permitting 31 the subnet manager with the lower hierarchy level to acquire or keep the master subnet manager state 121 in the subnet.

FIG. 1 shows further details concerning this embodiment. In 11, all nodes and paths are configured. In 13, the subnet manager performs a subnet sweep in the master state 121 of FIG. 3. In diamond 15, the master subnet manager determines whether or not a change in the network topology is discovered. If not, the execution is continued with performing the subnet sweep, 13. If a change is determined, in diamond 19, the master subnet manager determines if the discovered change is associated with an added or a removed or deleted network component. In case, a network component is deleted or removed, the master subnet manager updates the stored paths, 17, and continues with performing the subnet sweep, 13. In case, a network component is added, which results in a so-called new network component, the added paths will be investigated, 21. On this basis, the master subnet manager is permitted to determine whether the added network component has a new subnet manager in diamond 25. In the case, the new network component does not have a subnet manager, the active subnet manager updates its internal representation of the network topology and configures the new device and updates the paths, 23. In the case, the new network component has another subnet manager, the master subnet manager determines in diamond 27, whether the new subnet manager is in the master state. If the new subnet manager is not in the master state, the active subnet manager determines in diamond 29, whether handover requirements, based on a hierarchy level, are met. For example, a handover requirement may be a higher hierarchy level so that a subnet manager with the higher hierarchy level acquires the master state whereas the subnet manager with the lower hierarchy level acquires the standby state.

In this example, the handover requirements may be 1) of higher priority of the new subnet manager compared to that of the master subnet manager or, 2) in case the new subnet manager has the same priority, a numerically lower GUID compared to that of the master subnet manager. In case a handover requirement is fulfilled, conventionally, the master subnet manager should handover its master state to the new subnet manager. According to the invention however, in order to, for example, maintain a vendor specific capability set, in the case that the master subnet manager should hand over its master state to the new subnet manager according to the finding in diamond 29, the master subnet manager sends a disable control packet—which is represented by a SubnSet( ) SMP operation—to the new subnet manager and notices the ID and/or path of the disabled subnet manager in an internal database. Thus, the master subnet manager with its vendor specific features and/or capability set remains the master subnet manager. Further, it memorizes the subnet managers that it had sent into the not-active state 113, so that, in the case of a termination of the master subnet manager, it can send standby control packets and discovery control packets to all the subnet managers that it had sent into the not-active state 113, so that a failover of the master state of the active subnet manager to an other subnet manager can easily be performed without negatively affecting the network properties. In the case, in diamond 29, the master subnet manager finds that the handover requirements are not fulfilled, the new other subnet manager is simply configured as a new device and the paths are updated, 23. In this case, the new subnet manager is in the standby state 107. If, in diamond 25, the master subnet manager determines that the new subnet manager is also in the master state, in a subsequent diamond 35, the actual master subnet manager checks whether the handover requirement as described above are fulfilled. In case the handover requirements are fulfilled, execution is continued at reference sign 31 as described above. Every master subnet manager must respond to SubnSet( ) SMP operations that are issued by another master subnet manager commanding this subnet manager to change its state to the standby state or the not-active state. In case the handover requirements are not fulfilled, the master subnet manager waits for the handover, 37, until the handover is received, 39, from the new subnet manager. The new subnet manager looses it master state and changes to its standby state and the master subnet manager maintains its master state. The execution is then continued at 23.

Figure 2:
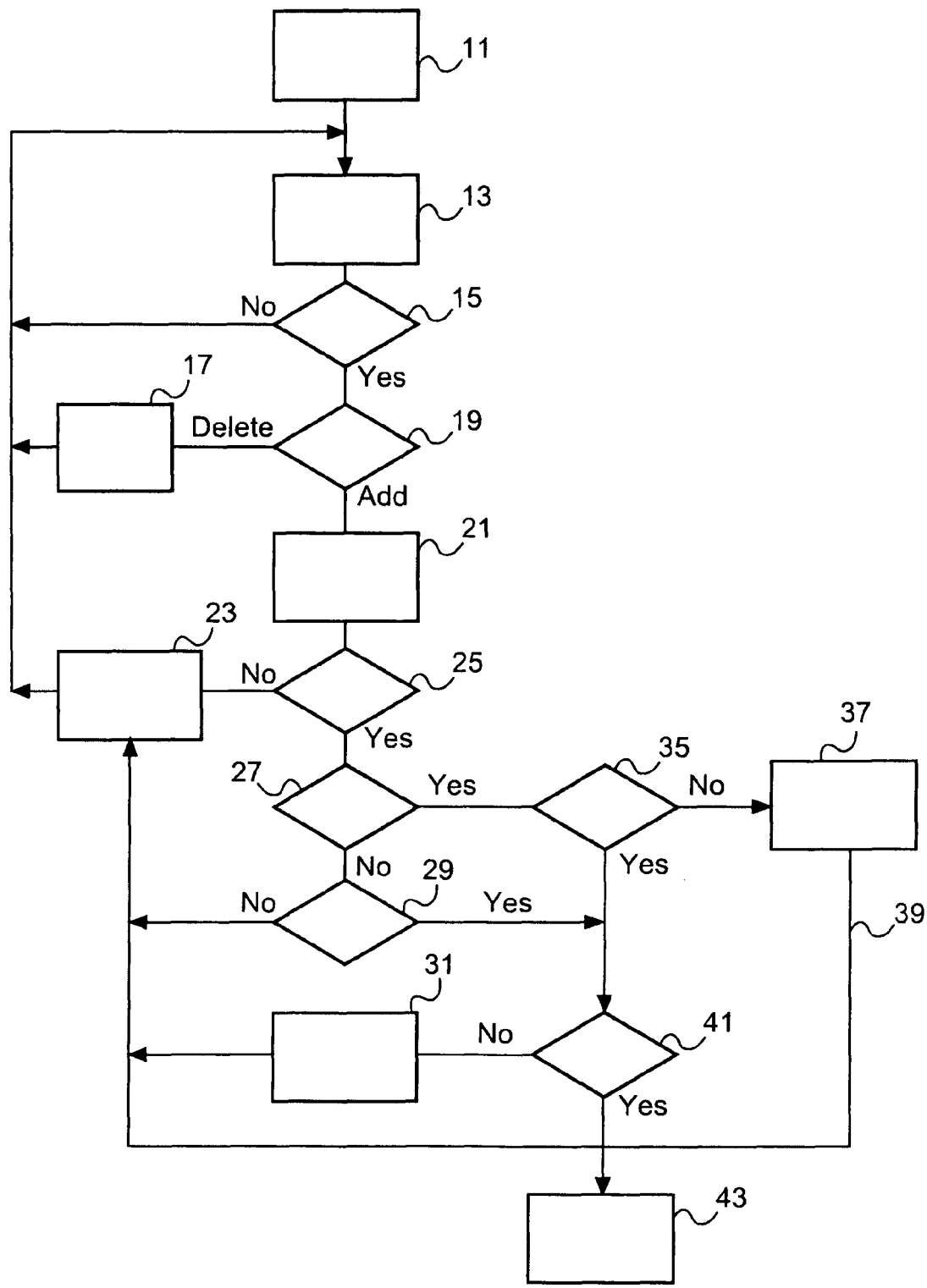

As shown in FIG. 2, in a further embodiment, the hierarchy level comprises a vendor information. If the other subnet manager is from the same vendor as the master subnet manager, the subnet manager sends a standby message 117 to all other subnet managers it has previously sent a disable message 115. The master subnet manager knows about the other subnet managers it has previously switched off by means of a database.

FIG. 2 shows further details concerning this embodiment. Reference numerals that are identical to reference numerals already mentioned with respect to FIG. 1 have identical or at least similar meaning so that an explanation can be omitted here. The difference with respect to the method associated with FIG. 1 is that, after having determined whether the handover requirements are fulfilled or not, in diamonds 29 or 35, the master subnet manager determines, 41, whether or not the other subnet manager is from the same subnet manager vendor as the master subnet manager. In case that both subnet managers are from the same vendor, the master subnet manager sends a handover packet to the high priority master, receives an acknowledge packet from the latter, exchanges its database with disabled subnet mangers, that is, sets the disabled subnet managers into the standby state again and further to the discovery state, and, finally, goes by itself into the standby state, in 43. In case the other subnet manager is not from the same vendor as the master subnet manager, execution is continued as described above with respect to 31.

In another embodiment, the idea of the invention becomes clear from the following: A subnet manager based on one preferred subnet manager implementation has been started within an existing Infiniband subnet and has become master subnet manager in the subnet. Now, a new Infiniband node is added to the subnet by an additional user. Furthermore, a subnet manager based on another vendor implementation is started with higher priority on the new node. The higher priority of the new subnet manager is detected from the actual running master subnet manager during the next discovering or looking for topology changes. According to the Infiniband specification in this case, the actual master subnet manager has to handover the master state to the subnet manager with the higher priority. Possibly, the actual master subnet manager is provided with specific capabilities which are used in the subnet, and which the subnet manager with the higher priority is not provided with.

The idea to prevent this, is the following change within the subnet manager state machine of the present subnet manager implementation: If the actual running master subnet manager detects an other running subnet manager with a higher hierarchy level, for example, a higher priority or same priority and lower GUID and the other subnet manager is based on an other subnet manager vendor implementation, the actual master subnet manager operated by the method of the present invention sends a disable message to the new subnet manager instead of performing a handover of the master state to the new subnet manager. As a consequence, the new subnet manager has to go from standby state to the not-active state. A subnet manager in the not-active state can not become master subnet manager. Thus, a vendor specific capability set of the master subnet managers is maintained within the administrated subnet, even though a new subnet manager with a higher hierarchy level has been detected.

The processing to determine the vendor type of the other subnet manager may be implemented by an additional communication interface.

If the running master subnet manager goes down or makes a failover of master to an other subnet manager which is based on the same vendor implementation, the actual running subnet manager sets all the subnet managers which it had set into the not-active state back to the standby state and preferably further to the discovery state before it looses its master state.

One of the advantages of the inventive method is as follows: The Infiniband specification defines only basic features of an Infiniband subnet manager. Actually and in the future, additional features of a subnet manager are necessary to improve the Infiniband subnet management. One example for an important additional feature is the implementation of a QoS manager as part of the subnet manager.

The inventive method permits advantageously that only subnet managers based on a certain vendor implementation become master in the subnet, provided that the initial active master subnet manager is from the certain vendor. Therefore, the method enables to ensure that all necessary subnet manager features from that vendor implementation are available for other nodes in the subnet as long as a subnet manager from this vendor type is available in the subnet.

An advantage of the proposed method is that the inventive extension within the actually specified state machine does not affect the functionality of subnet managers from other vendors.

According to the invention, an Infiniband network is contemplated that comprises a subnet manager that is adapted to operate according to the described inventive method.

The person skilled in the art will appreciate a computer program product with program code that is adapted to execute the inventive method when the code is operated on a computer.

Still further contemplated is a computer program that comprises instructions that are adapted to execute the method as described above when the code is operated on a computer. The person skilled in the art will appreciate this computer program when it is stored on a data storage medium.

The features of the invention as disclosed in the above description, in the claims and in the drawing may be of importance for the implementation of the various embodiments of the invention both individually and in any desired combination.

The invention may be used in other network types than Infiniband as well, if these networks are managed with subnet managers too.

What is claimed is:

1. A method of operating a first subnet manager in a subnet of an
   Infiniband network, wherein administration of the Infiniband network is performed by the first subnet manager acting as a master subnet manager, the method comprising:
   discovering, by the first subnet manager, a new network component added to the subnet;
   if a second subnet manager, different from the first subnet manager, is running on the new network component, evaluating which one of the first or second subnet managers has a lower hierarchy level; and determining whether the second subnet manager is from the same subnet manager vendor as the first subnet manager;
   if the second subnet manager has a higher hierarchy level and is from the same subnet manager vendor as the first subnet manager, the first subnet manager sending a message to a third subnet manager which is previously set by the first subnet manager to a not-active state, thereby commanding the third subnet manager to go to a standby state;
   if the second subnet manager has a higher hierarchy level but is not from the same subnet manager vendor, permitting the first subnet manager with the lower hierarchy level to maintain its master subnet manager state in the subnet, and sending a disable message to the second subnet manager, thereby setting the second subnet manager to a not-active state.

2. The method of claim 1, wherein the permitting comprises storing in a database the second subnet manager to which the disable message has been sent.

3. The method of claim 2, wherein, in a case where a master subnet manager is going to lose its master state, a standby message is sent to the third subnet manager that has been stored in the database.

4. Computer program product with program code embedded in a non-transitory computer-readable medium that is adapted to execute the method according to claim 3 when the code is operated on a computer.

5. A non-transitory computer-readable medium comprising instructions that are adapted to execute the method according to claim 3 when the code is operated on a computer.

6. The method of claim 1, wherein the hierarchy level is defined by at least one of a priority, a globally unique identifier, a vendor identifier, a memory size and a processor speed of the network component on which the first subnet manager runs.

7. Computer program product with program code embedded in a non-transitory computer-readable medium that is adapted to execute the method according to claim 1 when the code is operated on a computer.

8. A non-transitory computer-readable medium comprising instructions that are adapted to execute the method according to claim 1 when the code is operated on a computer.

9. An Infiniband network comprising:
- a processor;
- a memory;
- a first subnet manager, acting as a master subnet manger, that is adapted to discover a new network component added to the subnet;
    - if a second subnet manager, different from the first subnet manager, is running on the new network component, evaluate which one of the first or second subnet managers has a lower hierarchy level; and
- determine whether the second subnet manager is from the same subnet manager vendor as the first subnet manager;
- if the second subnet manager has a higher hierarchy level and is from the same subnet manager vendor as the first subnet manager, send a message to a third subnet manager which is previously set by the first subnet manager to a not-active state, thereby commanding the third subnet manager to go to a standby state;
- if the second subnet manager has a higher hierarchy level but is not from the same subnet manager vendor, permit the first subnet manager with the lower hierarchy level to maintain its master subnet manager state in the subnet, and send a disable message to the second subnet manager, thereby setting the second subnet manager to a not-active state.

* * * * *